United States Patent [19]

Mollenauer

[11] Patent Number: 5,557,441
[45] Date of Patent: *Sep. 17, 1996

[54] SOLITON TRANSMISSION SYSTEM HAVING PLURAL SLIDING-FREQUENCY GUIDING FILTER GROUPS

[75] Inventor: Linn F. Mollenauer, Colts Neck, N.J.

[73] Assignee: AT&T, Holmdel, N.J.

[*] Notice: The term of this patent shall not extend beyond the expiration date of Pat. No. 5,357,364.

[21] Appl. No.: 323,949

[22] Filed: Oct. 17, 1994

[51] Int. Cl.$^6$ .................................................. H04B 10/12
[52] U.S. Cl. ........................................... 359/173; 359/179
[58] Field of Search ................................... 359/127, 173, 359/179, 188, 195

[56] References Cited

U.S. PATENT DOCUMENTS

| 5,117,303 | 5/1992 | Desurvire | 359/341 |
| 5,140,656 | 8/1992 | Hasegawa | 385/24 |
| 5,357,364 | 10/1994 | Gordon | 359/173 |

OTHER PUBLICATIONS

"The sliding-frequency guiding filter: an improved form of soliton jitter control" Optics Ltrs., Nov. 15, 1992, vol. 17, No. 22, pp. 1575–1577, Mollenauer et al.
"Generation of Asymptotically stable optical solitons and suppression of the Gordon–Haus effect", Optics Ltrs., Jan. 1, 1992, vol. 17, No. 1, pp. 31–33 Kodama et al.
"Soliton Transmission Control", Optics Ltrs., Dec. 1, 1991, vol. 16, No. 23, pp. 1841–1843, Mecozzi et al.
"Wavelength–Tunable Optical Filters: Applications and Technologies", IEEE Com. Mag., Oct. 1989, pp. 53–63, Kobrinski et al.
"Demonstration, Using Sliding–Frequency Guiding Filters, of Error–Free Soliton Transmission Over More Than 20Mm At 10Gbit/s, Single Channel, and Over More Than 13Mm at 20Gbit/s in a Two–Channel WDM", Elec. Ltrs., vol. 29, No. 10, pp. 910–911, Mollenauer et al.

*Primary Examiner*—Wellington Chin
*Assistant Examiner*—Rafael Bacares
*Attorney, Agent, or Firm*—Stuart H. Mayer

[57] ABSTRACT

Timing jitter problems are effectively eliminated in a soliton transmission system realized by deploying a series of optical filters in groups whose group average center frequency intentionally differs from the group average center frequency of other optical filter groups. The center frequency of the series of optical filter groups is translated along the desired length of the system in a predetermined manner such as frequency increasing, frequency decreasing, and combinations of both. This creates a transmission environment which is substantially opaque to noise while remaining perfectly transparent to solitons. By arranging the optical filters in groups, it is possible to simplify the system design by reducing the number of filters having different nominal center frequencies.

7 Claims, 7 Drawing Sheets

SOLITON TRANSMISSION SYSTEM HAVING PLURAL SLIDING-FREQUENCY GUIDING FILTER GROUPS

CROSS-REFERENCE TO RELATED APPLICATION

This application is related to allowed, commonly assigned and co-pending U.S. patent application Ser. No. 07/904,239 (Gordon-Mollenauer Case 5-23) filed Jun. 25, 1992.

TECHNICAL FIELD

This invention relates to lightwave transmission systems and, more particularly, to such systems wherein optical filters are positioned at specific locations along the transmission medium of the lightwave system.

BACKGROUND OF THE INVENTION

Soliton transmission systems can potentially provide exceedingly high information transmission capacity over long distances. In ultra-long distance systems such as transcontinental and transoceanic systems, optical amplifiers periodically boost the power of propagating information-bearing soliton pulses sufficiently high to compensate for losses experienced in the fiber transmission medium. Unfortunately for ultra-long distance systems, however, the maximum information bit rate for a single channel is set by the amount of jitter in pulse arrival times generated by two different effects. One is the Gordon-Haus effect and the other is an acoustic interaction effect.

The Gordon-Haus effect is occasioned by the interaction of soliton pulses with amplifier spontaneous emission noise present along the transmission medium. J. P. Gordon et al. describe this effect in *Optic Letters*, Vol. 11, No. 10, pp. 665-7 (1986). Amplifier spontaneous emission noise alters both the amplitude and carrier or channel frequency of the soliton pulses at random resulting in a jitter in pulse arrival times. Pulse jitter can cause a soliton pulse to walk off into the time interval reserved for a neighboring soliton pulse. The result, often known as intersymbol interference, is an error in the received information.

M. Nakazawa et al. have suggested in *Electronics Letters*, Vol. 27, p. 1270 (1991) that active electronic devices such as modulators to provide time domain filtering could be used to eliminate soliton pulse arrival time jitter. This technique is not only costly, complex, and difficult to implement but it also suffers the same incompatibility with wavelength-division-multiplexing experienced by electronic regeneration of optical signals.

A simpler alternative for reducing jitter from the Gordon-Haus effect was described in U.S. Pat. No. 5,140,656 issued to Hasegawa et al. and disclosed in articles by Y. Kodama et al. in *Optics Letters*, Vol. 17, No. 1, pp. 31–3 (1992) and by A. Mecozzi et al. in *Optics Letters*, Vol. 16, No. 23, pp. 1841–3 (1991). These references propose the use of linear narrow-band filters (called "frequency guiding filters") spaced at regular predetermined intervals along the transmission fiber. Each filter, in essence, shapes the frequency dependent gain characteristic of the corresponding amplifier. The linear filters are effectively identical within manufacturing tolerances in that each filter exhibits a center frequency substantially equal to the soliton center frequency. However, the introduction of filters causes additional soliton pulse energy loss which, in turn, must be offset by higher gain from the optical amplifiers. This higher gain, however, results in an exponential increase with increasing distance of those spectral components of the noise at, or near, the filter response peak. As a result, the maximum usable filter strength is limited as is the amount of realizable jitter reduction. A recent experiment using the frequency guiding filters was reported by L. Mollenauer et al. in *Electronics Letters*, Vol. 28, p. 792 (1992) for a 10,000 km soliton transmission system in which the filter achieving the lowest bit error rate caused a 50% reduction in the standard deviation of the timing jitter.

SUMMARY OF THE INVENTION

Timing jitter problems are greatly reduced in a soliton transmission system by deploying a series of optical filters whose center frequencies intentionally differ from one another, or from a a predetermined reference frequency, by a varying amount. For example, the center frequency of any particular filter differs from the center frequency of the adjacent optical filters. The center frequency of the series of optical filters is translated toward a desired frequency—giving rise to the newly coined term "sliding-frequency guiding filter"—along the desired length of the system in a predetermined manner such as frequency increasing, frequency decreasing, and combinations of both. This creates a transmission environment which is substantially opaque to noise while remaining perfectly transparent to solitons. As a result, stronger filter response characteristics can be used to achieve greater jitter reduction than prior art systems. In this system, the use of stronger filter response characteristics does not incur the usual penalty of exponentially rising noise from the excess amplifier gain required to overcome the additional filter loss.

In this new transmission system, solitons are launched at a particular frequency $\Omega$ and are accelerated toward each successively different center frequency $\omega_{f,n}$ (n=1, 2, ... N) in the series of sliding-frequency guiding filters thereby causing each soliton to emerge at a remote end of the transmission system at a substantially different frequency from the launch frequency.

In an improvement over the proposed soliton transmission system above, I have discovered that the new system can be further simplified and the number of different filter center frequencies can be reduced without impairing the transmission environment which is substantially opaque to noise while remaining transparent to the solitons. Specifically, the system including N×L optical filters will have N consecutive optical filters designated to one particular filter group. L such filter groups are then formed along the transmission system. Filters in each filter group combine to have a group average center frequency. The group average center frequency for one group differs from the group average center frequency for every other group along the system. Over the system, the group average center frequencies of the L groups are selected and distributed to provide an average frequency sliding rate (per unit distance) for the solitons.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

For the description below, it is useful to define the term nominal center frequency as applied to filters. In the first instance, etalons and other filter types may not have a response curve which lends itself easily to defining a center frequency because of a lack of 3 dB points on the curve. In order to overcome this problem and handle potentially all filter types with a suitable term, the nominal center frequency of a filter is understood to be the frequency lying between the 3 dB points on a frequency response curve raised to an arbitrary power greater than unity which allows such 3 dB points to appear.

Figure 1:
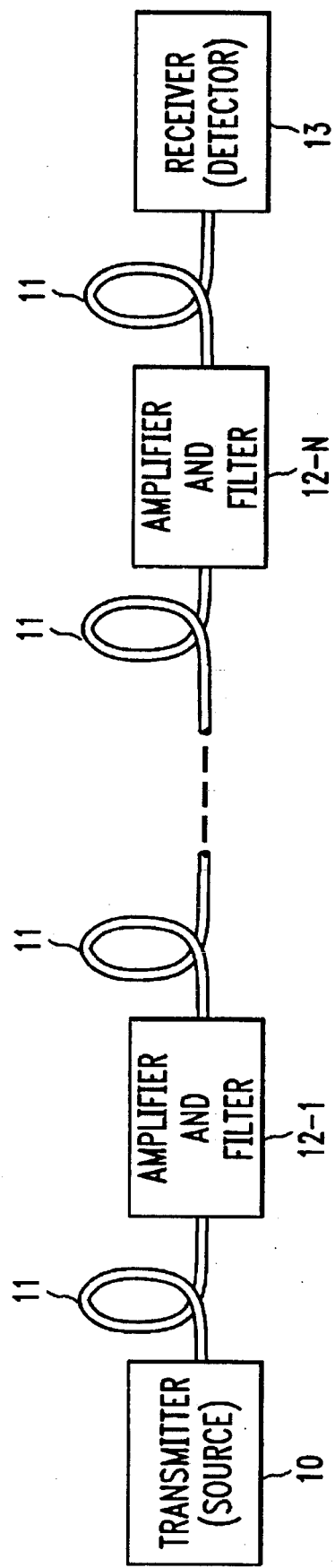
FIG. 1 shows an exemplary soliton transmission system.

An optical fiber transmission system as shown in FIG. 1 includes a transmitter, a receiver and a transmission medium interconnecting the transmitter and the receiver. Soliton pulses of optical radiation are generated at a nominal soliton center frequency $\Omega$ by transmitter 10. The pulses are then coupled in the transmission medium which comprises lengths of optical fiber 11 and optical amplifiers and filters 12 disposed at predetermined intervals along the transmission medium. After transmission through the transmission medium, the pulses are then detected at receiver 13.

Unidirectional transmission is depicted in order to simplify the explanation of the principles of the present invention without limiting the scope of the invention. This invention is applicable to bidirectional transmission systems. Moreover, the fundamental principles of the present invention are described in terms of a single channel or single frequency soliton system. It will be briefly described herein that the principles of the present invention are extendible to frequency-division-multiplexed systems utilizing a plurality of different soliton frequency channels.

Creation of soliton pulses is dependent upon proper launch and transmission characteristics such as pulse power, pulse width, center frequency, fiber dispersion and the like. These characteristics are well known to those skilled in the art and will not be discussed further herein. For additional background information concerning soliton generation and soliton transmission, see *Optical Fiber Telecommunications II*, ed. S. E. Miller et al., pp. 90 et seq. (Academic Press 1988) and see also U.S. Pat. No. 4,406,516.

The transmission medium covers an system path length L between the transmitter and the receiver. In most systems of interest such as transoceanic or transcontinental systems, the system path length is at least several thousand kilometers. Such long distance soliton transmission media are generally realized by a plurality of lengths of optical fiber 11 which are desirably single mode optical fibers having the appropriate group velocity dispersion for supporting soliton propagation at frequency $\Omega$ and, as will be described below, at those frequencies caused by the action of the sliding-frequency guiding filters. Silica-based optical fibers are suitable for this application. Fibers employing different materials as well as different properties such as polarization preservation are contemplated for use herein.

Optical amplifiers and filters 12 are shown as a single element having portions providing optical amplification and optical filtering. In practice, several elements such as separate amplifiers and filters may be desired for realizing element 12. Each amplifier portion comprises an optically pumped section of rare earth doped optical fiber to provide gain to pulses propagating at the soliton center frequency. Each filtering portion comprises an in-line linear filter having a frequency dependent response characteristic defined around a nominal filter center frequency $\omega_f$. The filter response characteristic is selected to provide a suitable amount of bandwidth limiting. Optical coupling elements may also be required to transfer the optical pulses to and from each optical amplifier and filter 12. These elements are well known in the relevant art and have not been shown in the FIGs.

Optical filters are realizable from Fabry-Perot etalons, fiber Fabry-Perot etalons and the like. Fiber Fabry-Perot etalon filters have been disclosed in U.S. Pat. No. 4,861,136, U.S. Pat. No. 4,830,451 and U.S. Pat. No. 5,037,180 which are expressly incorporated herein by reference. A multiport optical filter utilizing a Fabry-Perot etalon for wavelength selectivity is described in U.S. Pat. No. 5,050,954. Other exemplary wavelength-tunable optical filters are described by H. Kobrinski et al. in *IEEE Communications Magazine*, pp. 53–63 (October 1989), also expressly incorporated herein by reference. Etalons exhibit many desirable characteristics such as tunability, appropriate shaping near the response peak, and a periodic comb characteristic which, in the latter instance, lends to their attractiveness for wavelength-division-multiplexing applications.

Optical amplifiers such as erbium-doped optical fiber amplifiers or Raman amplifiers are used in the system because they amplify the optical signals in the optical domain without requiring an opto-electronic or electrooptic conversion in the process. Such amplifiers generally require a pump source for generating the optical pump beam and a means for coupling the pump beam into the optical amplifying medium. These elements are not shown in the FIGs. When operating with the associated filters, it is desirable that each amplifier compensate the loss related to insertion of the associated filter.

Each optical filter in optical amplifier and filter 12-1 through 12-N is set to a nominal filter center frequency $\omega_{f,1}$ through $\omega_{f,N}$, respectively, wherein the nominal filter center frequencies are intentionally detuned from a reference frequency by some prescribed, varying amount. For example, the center frequency of the optical filters may be different from each other and from the nominal center frequency $\Omega$ of the soliton as it is launched into the relevant portion of the transmission system. This allows for the use of stronger filters which, in turn, greatly reduces timing jitter problems in the soliton transmission system. The center frequency of each successive optical filter is translated up or translated down in a predetermined pattern such as frequency increasing, frequency decreasing, and combinations of both. From the system point of view for a particular channel, the associated filter frequencies are seen to be sliding with respect to an arbitrary reference frequency such as the launch frequency $\Omega$ of the solitons. Thus, filters realized in accordance with the teachings herein are now called "sliding-frequency guiding filters."

The use of the sliding-frequency guiding filters in optical amplifiers and filters 12 creates a transmission environment which is substantially opaque to noise while remaining perfectly transparent to solitons. Opacity to noise exists for all but a small fraction of the total system length. This will be described below with respect to FIG. 8. An alternative way of describing the transmission environment created by use of the invention is that it permits solitons to leave behind, at some fixed distance and in a different frequency band, the noise emanating from the amplification process. In essence, the solitons are adiabatically and intentionally dragged away in the frequency domain from their related amplified noise. In this new transmission system, solitons are launched at a particular frequency $\Omega$ and, as they propagate along the transmission medium, are accelerated toward successively different frequencies determined by each optical filter center frequency $\omega_{f,n}$ (n=1, 2, ... N) for the series of sliding-frequency guiding filters thereby causing each soliton to emerge at a substantially different frequency from the launch frequency.

It should be noted that only the nonlinear (soliton) pulses can shift frequency along with the sliding-frequency guiding filters. The reason for this is that the nonlinear term in the propagation equation allows the soliton pulses to generate the new frequency components required for the sliding. "Linear" pulses including noise, on the other hand, cannot generate the required new frequencies and hence eventually suffer catastrophic energy loss from the action of the sliding filters. Thus, the invention described here takes advantage of the fact that the soliton pulses are nonlinear in a new and highly effective way.

For the initial portion of the description which follows, it is proposed that all filters along the entire transmission medium exhibit the sliding-frequency guiding property. However, it is contemplated that the principles of the present invention extend to a system in which at least some relevant portion of the transmission medium includes two or more optical filters exhibiting the sliding-frequency guiding property. For example, it may be desirable to shed dispersive wave radiation via sliding-frequency guiding filters in the initial portion of the system transmission medium while having standard filtering in the remaining portion of the transmission medium. Alternatively, it may be desirable to follow a transmission medium section of positive sliding as in FIG. 3 with a transmission medium section of negative sliding wherein the filter center frequencies decrease over distance.

It is important to distinguish the intentional nominal center frequency translation of the inventive sliding-frequency guiding filters from the prior art filters designed with a substantially identical nominal center frequency yet exhibiting small frequency deviations resulting from unintentional manufacturing defects or manufacturing tolerances. In the case of sliding-frequency guiding filters depicted in FIGS. 3–5, the amount of frequency translation for soliton pulses over the relevant portion of the system is a significant fraction of the soliton bandwidth. That is, $|\omega_{f,N}-\omega_{f,1}|$ is at least of the order of $0.5 \cdot B_{sol}$ ($B_{sol}$ is the soliton bandwidth).

Figure 2:
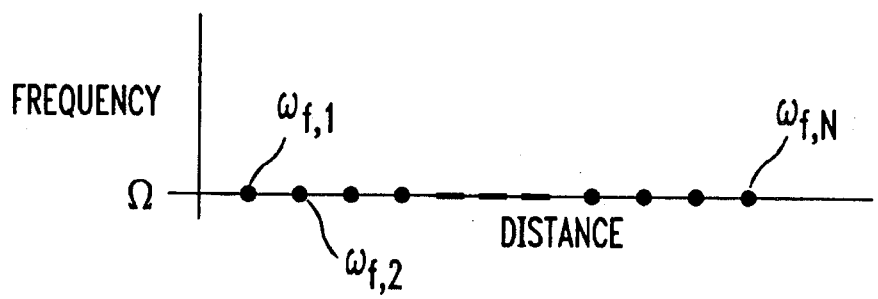
FIGS. 2 through 5 shows the relationship of the nominal filter center frequency to the transmission system length.

When compared with the soliton bandwidth, the frequency differences for the prior art filters in soliton transmission systems as depicted in FIG. 2 are such that solitons emerge from the system at substantially the same frequency with which they were launched. That is, $|\omega_{f,N}-\omega_{f,1}|$ is approximately zero. For the latter case, the prior art systems utilize substantially identical filters along the transmission medium. But, the substantial identity of the filters is observable only within manufacturing limits.

When employing the sliding-frequency guiding filters as taught herein, stronger filter response characteristics are employable thereby achieving greater jitter reduction than prior art systems without incurring the usual penalty of exponentially rising noise from the excess amplifier gain required to overcome the additional filter loss. The strength of the filter response is a function of the curvature of the filter response peak. Strong filtering is generally associated with sharp cutoff frequencies and high quality (Q) factors.

Figure 3:
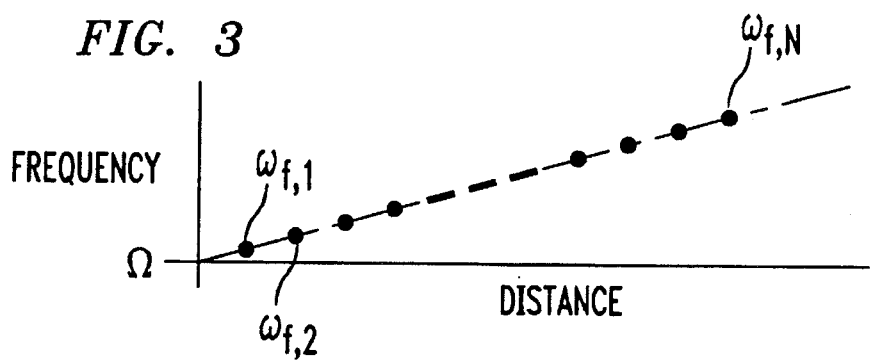
Figure 4:
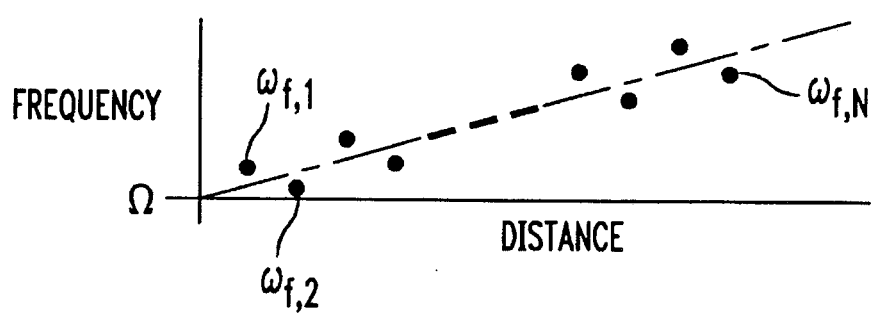
Figure 5:
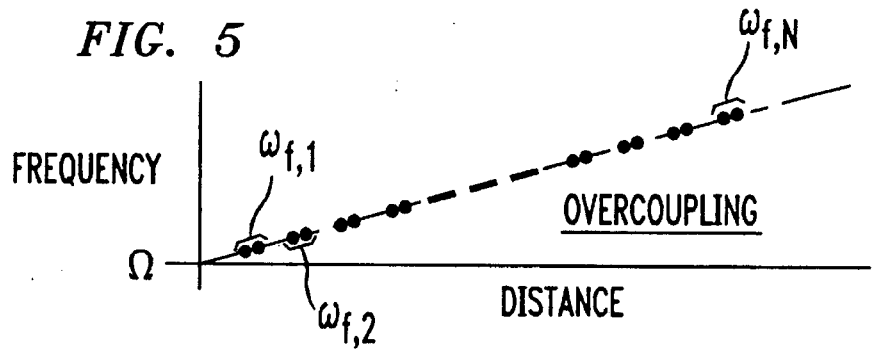

Exemplary transmission media exhibiting principles of the sliding-frequency guiding filter invention are shown in FIGS. 3–5. In FIG. 3, the nominal center frequency of each successive filter along the transmission medium increases monotonically with distance. It is contemplated that the nominal center frequencies of consecutive filters can decrease monotonically with distance.

In FIG. 4, the nominal center frequencies of consecutive filters are staggered in an alternating pattern around a straight line. Such stagger tuning allows for a cumulative filter transmission shape, attained by consecutive filters such as $\omega_{f,1}$ and $\omega_{f,2}$, for example, which is flatter near the peak and has steeper sides. This altered filter transmission shape in turn allows for stronger guiding of the soliton pulses and greater jitter reduction for a given soliton energy loss. Equivalently, it allows a reduced loss and hence for reduced build-up of noise for a given degree of guiding.

Figure 7:
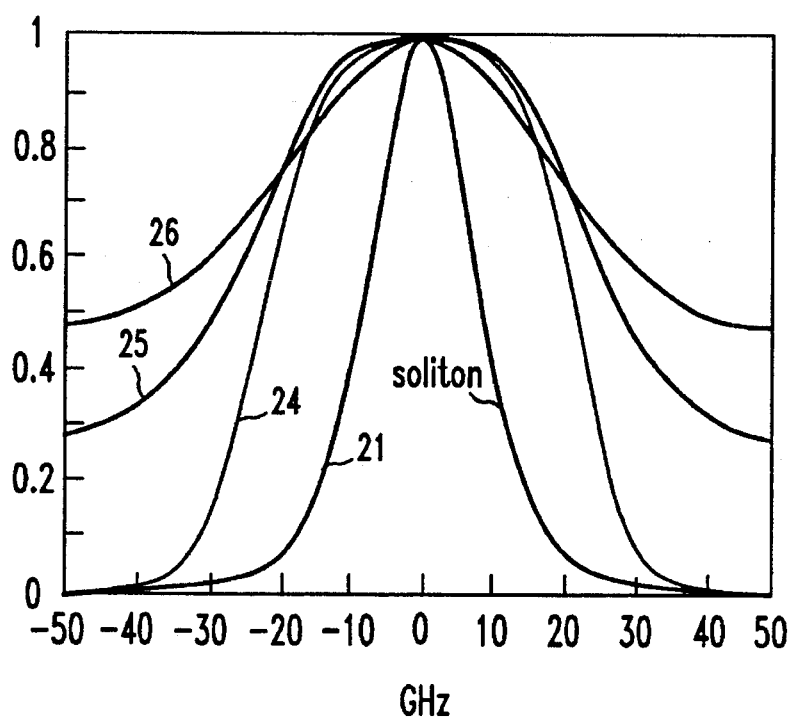
FIG. 7 compares the transmission curves for exemplary etalon filter pairs and a super-Gaussian filter with the spectrum for a soliton.

In FIG. 5, each filter is shown to comprise two filters at the same nominal center frequency to create overcoupling and, thereby, a stronger filter response as shown by curve 25 in FIG. 7.

While FIGS. 3–5 show substantially equal detuning amounts between the center frequencies of consecutive filters (FIGS. 3 and 5) or alternate filters (FIG. 4), it is contemplated that different or unequal detuning amounts can be employed for the filters along the transmission medium. In other words, the frequency difference between center frequencies of adjacent filters need not be equal for the entire transmission medium. Moreover, the spacing of filters need not occur at regular, periodic intervals nor in conjunction with each and every amplifier. Irregular filters spacings are contemplated within the principles of the present invention.

For the transmission media shown in FIGS. 3–5, the rate of change of nominal center frequency detuning as a function of distance is less than a prescribed maximum. If the maximum rate were exceeded, then amplitude and frequency fluctuations would create an unstable condition leading eventually to the elimination of the soliton pulses. For a parabolically shaped filter peak response, the exemplary maximum rate has been determined to be approximately $(2/27)^{1/2}\eta$, where $\eta$ describes the curvature per unit soliton length of the parabolically shaped filter response around the peak at the nominal center frequency. Typically, the results of such instabilities are seen over distances on the order of the soliton unit distance, $z_c$.

The following description provides the presently understood theoretical basis underlying this invention. Also, examples from experimental simulations are included to show the performance of a soliton transmission system including the sliding-frequency guiding filters.

The propagation equation for solitons, including filter loss and compensating gain from the amplifying elements, is:

$$\frac{\partial u}{\partial z} = i\left[\frac{1}{2}\frac{\partial^2 u}{\partial t^2} + u^*u^2\right] + \quad 1$$

$$\frac{1}{2}\left(\alpha - \eta\left(i\frac{\partial}{\partial t} - \omega_f\right)^2\right)u \quad 2$$

where $\alpha$ and $\eta$ are the excess gain and filter peak curvature, respectively, per unit length and where $\omega_f$ is the nominal peak or center frequency of an optical filter per unit length. Although the quantities $\alpha$ and $\eta$ are characterized as continuously distributed quantities, it will be shown immediately below that they are easily converted into lumped, periodic equivalent quantities consistent with the use of lumped periodic amplifying and filtering elements 12.

The propagation of solitons in a fiber is most conveniently described in terms of a differential equation, the nonlinear Schrödinger equation. All quantities in the equation are treated as continuously distributed, and many parameters are typically considered constant as well. Yet realizable systems tend to involve quantities that have significant periodic variation such as the soliton pulse energy while many others such as amplifiers and filters are at the extreme of such variation, i.e., they are "lumped". When the periods in question are short enough relative to the soliton unit distance, $z_c$, lumped quantities can be converted into their continuously distributed equivalents, and all other periodically varying quantities replaced by their path-average equivalents. Then the real system behaves remarkably like its continuously distributed equivalent.

In particular, in the theoretical treatment of soliton propagation through a set of guiding filters, the filter effect is regarded as continuously distributed. The quantity $\eta$ is the curvature of the filter response, at its peak, per unit length along the transmission medium. More precisely stated, for a small enough distance dz, the transmission factor T at the frequency $\omega$, for filters with resonance peak at $\omega_f$, is, $$T(\omega, dz) = 1 - [\eta(\omega - \omega_f)^2 dz]. \quad 2$$

Since the transmission factor over a finite distance z is the product of the factors given by EQ. 2, the logarithm of that factor is just the sum of the logarithms of EQ. 2. Making use of the fact that $\ln(1-\epsilon) = -\epsilon$ for $|\epsilon| \ll 1$, one then has:

$$lnT(\omega,z) = -\eta(\omega - \omega_f)^2 \int_0^z dz \quad 3$$

or $$T(\omega,z) = \exp[-\eta(\omega - \omega_f)^2 z]. \quad 4$$

By realizing lumped filters with a curvature $\eta_f$ and a constant spacing L, where L is short relative to $z_c$, the correspondence between the continuously distributed $\eta$ of theoretical work and the $\eta_f$ of the practical lumped filters is simply, $$\eta_f = \eta L. \quad 5$$

Consistent with the description above, it is possible to write the transmission factor of an individual lumped filter as $$T(\omega) = \exp[-\eta_f(\omega - \omega_f)^2] \quad 6$$

Most practical filters such as the etalon, for example, have a transmission factor which is in general significantly different from that of EQ. 6, except for a region near the filter peak. Fortunately, however, one can show that the practical lumped filters guide solitons (dampen their amplitude and timing jitters) almost the same as the continuous filters of EQs. 2 and 3, as long as they have essentially the same behavior near their peaks, that is, as long as the transmission of the practical filter is essentially parabolic near its peak and as long as EQ. 5 is satisfied. The transmission function of an etalon is, $$T(\delta f) = \frac{1}{1 + \frac{4R}{(1-R)^2}\sin^2[(\pi\delta f)/(\Delta f)]} \quad 7$$

where R is the common reflectivity of the etalon mirrors, where $\delta f$ is the frequency difference, in practical units, corresponding to $\omega - \omega_p$, and where the free spectral range (separation between adjacent resonance peaks) of the etalon, $\Delta f$, is given by $$\Delta f = \frac{c}{2d} \quad 8$$

where d is the (air) gap between mirrors. By expanding EQ. 7 about $\delta f = 0$, one can easily show that the etalon's peak curvature, referred to the practical frequency difference ($\delta f$), is $$\eta_f = \frac{R}{(1-R)^2}\frac{4\pi^2}{(\Delta f)^2}. \quad 9$$

In theoretical work, unless otherwise indicated, instead of the practical units of meters, seconds, Gigahertz, etc., it is possible to use the special soliton units $z_c$, $t_c$, and $\omega_c$, respectively. The soliton unit length, $z_c$, is a characteristic length for dispersive effects, and is given by $$z_c = 0.322\frac{2\pi c}{\lambda^2}\frac{\tau^2}{D} \quad 10$$

where c is the vacuum speed of light, $\lambda$ the wavelength, $\tau$ the full-width at half-maximum (FWHM) bandwidth of the soliton, and D is the optical fiber group delay parameter represented in units of time/unit wavelength-shift/unit length. Within the context of ultra long distance soliton transmission, $z_c$ is typically at least many hundreds of kilometers long. The soliton unit time, $t_c$, is $$t_c = \frac{\tau}{2\cosh^{-1}\sqrt{2}} = \frac{\tau}{1.762747}\cdots \quad 11$$

where $\tau$ is the full width at half maximum of the soliton pulse. Finally, the soliton unit frequency, $\omega_c$, is one radian per $t_c$. Thus, the frequencies $\omega$, in soliton units, are converted to practical frequencies, as $$f(GHz) = \frac{\omega}{2\pi t_c} \times 10^{-9} = (1.7627\ldots) \times \frac{\omega}{2\pi\tau} \times 10^{-9}. \quad 12$$

In an example of sliding-frequency guiding filters to be discussed in more detail below, it is assumed that $\tau = 20$ psec and D = 0.4 psec/nm/km, so that (by virtue of EQ. 10) $z_c = 250$ km, and (by virtue of EQ. 12) $\omega_c$ corresponds to 14.0 GHz. It is also assumed that $\eta = 0.6$ (per $\omega_c 2$ and per $z_c$). Thus, in practical units, $\eta$ becomes $$\eta(GHz^{-2}km^{-1}) = \frac{0.6}{14^2 \times 250} = 1.2245 \times 10^{-5}. \quad 13$$

If there is one filter every 30 km, then from EQ. 5, $$\eta_f(GHz^{-2}) = 30 \times 1.2245 \times 10^{-5} = 3.6735 \times 10^{-4}. \quad 14$$

Figure 6:
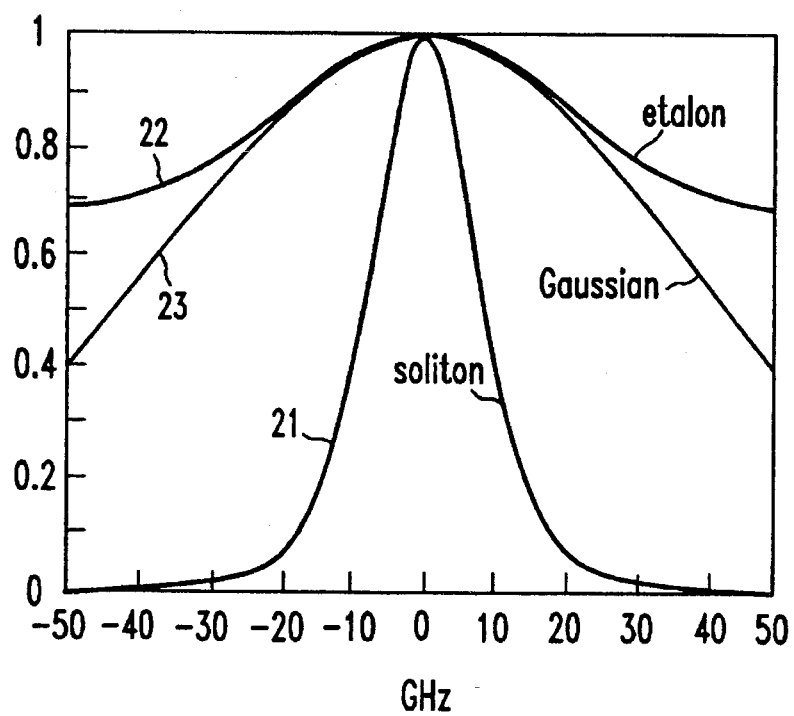
FIG. 6 compares the transmission curves for an exemplary etalon filter and a Gaussian filter with the spectrum for a soliton.

In order to obtain this filter strength from etalons having a free spectral range (WDM channel spacing) $\Delta f = 100$ GHz ($\Delta\lambda = 0.8$ nm at $\lambda \approx 1550$ nm), from EQ. 10 it is known that the etalons must have a spacing d=1.5 mm. Putting the $\eta_f$ and $\Delta f$ we have just calculated into EQ. 9, one obtains R=0.0930 $(1-R)^2$, and solving, one obtains R=0.0789. FIG. 6 shows the transmission curve for such an etalon (curve 22), compared with that of the corresponding Gaussian frequency response spectrum (curve 23) and with the frequency spectrum of the 20 psec wide soliton (curve 21). The strength of the filtering is best judged from the cumulative effect over one soliton unit distance ($z_c$).

By way of further comparison, FIG. 7 shows the transmission curves for a pair of non-staggered etalons (curve 26) as shown by each filter pair in FIG. 5, a pair of staggered etalons (curve 25) as shown by a pair of adjacent filters in FIG. 4, and a super-Gaussian frequency response spectrum (curve 24) compared with the frequency spectrum of the 20 psec wide soliton (curve 21).

Prior art systems which are characterized as being without sliding-frequency guiding filters are described as having $d\omega_f/dz \equiv \omega_f' = 0$ where z is distance in terms of the system length. For convenience, $\omega_f$ is set to zero which allows the exact stationary solution to EQ. 1 to be found as:

$$u = \sqrt{P} \, \text{sech}(t) \exp(i\phi) \qquad 15$$

where $100 = Kz - v \ln \cosh(t)$ and where the parameters $\alpha$, $\eta$, P, and v satisfy the following relationships:

$$v = \frac{3}{2\eta} \left[ \sqrt{1 + \frac{8\eta^2}{9}} - 1 \right] = \frac{2}{3} \eta - \frac{4}{27} \eta^3 + \ldots \qquad 16$$

$$\alpha = (\eta/3)(1 + v^2) \qquad 17$$

$$P = (1 + \eta^2)(1 - v^2/2) \qquad 18$$

The parameter P indicates soliton amplitude (power) while the parameter v involves frequency chirp. From EQ. 15, the frequency of a soliton pulse is chirped so that $\partial\phi/\partial t = -v \tanh(t)$. Because of this chirp, both the bandwidth and the time-bandwidth product of the soliton pulse are increased by the factor $(1+v^2)$.

By numerical simulation, we have been able to show that use of the inventive sliding-frequency guiding filters, within certain limits given below, does not significantly alter this solution. The use of sliding-frequency guiding filters does, however, alter the damping of amplitude and frequency fluctuations for the soliton pulses. To investigate the damping with sliding, the general form for the soliton is introduced into EQ. 1 as $u = A \, \text{sech}(At - q) \exp(-i\Omega t + i\phi)$. The following pair of coupled, first order perturbation equations are obtained as follows:

$$\frac{1}{A} \frac{dA}{dz} = \alpha - \eta \left[ (\Omega - \omega_f)^2 + \frac{1}{3} A^2 \right] \qquad 19$$

$$\frac{d\Omega}{dz} = -\frac{2}{3} \eta (\Omega - \omega_f) A^2 \qquad 20$$

where $\omega_f(z)$ is the frequency of the filter peak at distance z along the transmission medium. Equilibrium at A=1 and at constant $\omega_f$ requires that the soliton frequency $\Omega$ lag behind the filter frequencies by an amount $$(\Omega - \omega_f) = -\frac{3}{2\eta} \omega_f' \qquad 21$$

This frequency offset further increases the loss from the filter because the soliton pulse is positioned on a negative or positive slope of the filter response characteristic. As a result, the excess gain $\alpha$ must increase as follows:

$$\alpha = \eta \left[ \frac{1}{3} + \left( \frac{3\omega_f'}{2\eta} \right)^2 \right]. \qquad 22$$

This value of $\alpha$ is then inserted into the EQs. 19 and 20. In order to understand more clearly how fluctuations are damped by the sliding-frequency guiding filters, it is useful to introduce small fluctuation parameters $\alpha$ and $\Delta$ into the relationships for A and $\Omega$ as follows: $A=1+\alpha$ and $\Omega=\omega_f-(3\omega_f'/2\eta)+\Delta$. By linearizing the equations with respect to the small fluctuations, we obtain the following coupled equations:

$$\frac{da}{dz} = -\frac{2}{3} \eta \alpha + 3\omega_f' \Delta \qquad 23$$

$$\frac{d\Delta}{dz} = -\frac{2}{3} \eta \Delta + 2\omega_f' \alpha. \qquad 24$$

By letting the derivatives in EQs. 23 and 24 have the common value $-\gamma$, we can decouple the equations and obtain the normal modes:

$$x_1 = \Delta - \sqrt{\frac{2}{3}} \, \alpha, \; x_2 = \Delta + \sqrt{\frac{2}{3}} \, \alpha, \qquad 25$$

where the corresponding decay constants $\gamma_1$ and $\gamma_2$ are given as:

$$\gamma_1 = \frac{2}{3} \eta - \sqrt{6} \, \omega_f' \quad \gamma_2 = \frac{2}{3} \eta + \sqrt{6} \, \omega_f'. \qquad 26$$

For stability, both $\gamma_1$ and $\gamma_2$ must remain positive. This, in turn, sets a maximum allowable sliding rate for parabolically shaped filter response peaks as follows:

$$|\omega_f'|_{max} = \sqrt{\frac{2}{27}} \, \eta \qquad 27$$

For brevity, we merely quote the results of our computation of the variances in soliton energy and arrival time. The normalized variance in signal energy is, $$\frac{\langle \delta E_s^2 \rangle}{E_s^2} = \qquad 28$$

$$\frac{N}{4E_s} \left[ 3 \frac{1 - e^{-2\gamma_1 z}}{2\gamma_1} + 3 \frac{1 - e^{-2\gamma_2 z}}{2\gamma_2} + 2 \frac{1 - e^{-(\gamma_1+\gamma_2)z}}{\gamma_1 + \gamma_2} \right]$$

where N is the spontaneous emission noise spectral density generated per unit length of the transmission medium. For $\gamma z \gg 1$, the variance comes to an equilibrium value $$\frac{\langle \delta E_s^2 \rangle}{E_s^2} = \frac{N}{\gamma_{eff} E_s} \qquad 29$$

where $\gamma_{eff}$ is given by, $$\frac{1}{\gamma_{eff}} = \frac{3}{8\gamma_1} + \frac{3}{8\gamma_2} + \frac{1}{2(\gamma_1 + \gamma_2)} . \qquad 30$$

For the prior art case of no sliding filters, the damping constants are equal, $\gamma_1 = \gamma_2 = \gamma_{eff}$, as required.

The reduction factor for the variance of the timing jitter experienced from the use of the sliding-frequency guiding filters along the transmission medium is given by, $$f(\gamma_1, \gamma_2, z) = \frac{3}{4} f_{11}(z) + \frac{3}{4} f_{22}(z) - \frac{1}{2} f_{12}(z) \qquad 31$$

where the $f_{ij}(z)$ are given by, $$f_{ij}(z) = \qquad 32$$

$$\frac{3}{\gamma_i\gamma_j z^2}\left[1 - \frac{1-e^{-\gamma_i z}}{\gamma_i z} - \frac{1-e^{-\gamma_j z}}{\gamma_j z} - \frac{1-e^{-(\gamma_i+\gamma_j)z}}{(\gamma_i+\gamma_j)z}\right].$$

Here, for $\gamma z \gg 1$, $$f(\gamma_{\mathit{eff}}, z) \approx \frac{3}{(\gamma_{\mathit{eff}} z)^2} \qquad 33$$

where $\gamma_{\mathit{eff}}$ is now given by, $$\frac{1}{(\gamma_{\mathit{eff}})^2} = \frac{3}{4\gamma_1^2} + \frac{3}{4\gamma_2^2} - \frac{1}{2\gamma_1\gamma_2}. \qquad 34$$

Finally, it should be noted that EQs. and yield the f(x) of EQ. 28 of the *Optics Letters* paper by Kodama, supra, describing the prior art transmission system having no sliding-frequency guiding filters, that is, when $\gamma_1=\gamma_2$.

Noise reduction and the other practical benefits accruing from the use of sliding-frequency guiding filters are described in relation to a specific example below. Consistent with a single-channel rate of 10 Gbps with commonly polarized soliton pulses, or with 20 Gbps when neighboring pulses are orthogonally polarized, the soliton pulse width (FWHM) $\tau$ is assumed to be approximately 20 psec. The assumed pulse width when combined with a group velocity dispersion for optical fiber 11, D=0.4 ps/nm/km, yields roughly the same soliton pulse energy reported in our recent article at *Electronics Letters*, Vol. 28, p. 792 (1992), where the safety margin against energy errors was about a factor of two at 10 Mm. Consequently, the soliton unit distance $z_c$ is approximately 250 km at a transmission wavelength $\lambda$ of approximately 1556 nm. Consistent with the jitter reduction we wish to achieve, yet just small enough not to push the limits of first order perturbation theory too hard, we chose the filter curvature parameter $\eta$=0.6—a filter strength value about 7.5 times larger than reported in any prior art experiment. To prevent the reduction factor in standard deviation of jitter (the square root of EQ. 32) from becoming no more than about 1.5 times its value with no sliding filters, we make $\omega'_f=\eta/6=0.1$ which is approximately 0.6 max($\omega'_f$). Since here the soliton frequency unit is equivalent to 14 GHz, the sliding rate represented in practical units is 5.6 GHz/Mm. Thus, the total frequency translation over the entire transmission path of 10 Mm is only 56 GHz, or just slightly more than three soliton bandwidths, $B_{sol}$. Finally, to compute the excess gain $\alpha$ correctly, EQ. 22 is modified to include effects of the bandwidth factor $1+v^2$ as in EQ. 17:

$$\alpha = \eta\left[\frac{1+v^2}{3} + \left(\frac{3\omega'_f}{2\eta(1+v^2)}\right)^2\right]. \qquad 35$$

It should be understood that $\alpha$ is proportional to the rate at which noise grows in the system. From $1+v^2=1.132$ and the values of $\eta$ and $\omega'_f$ given above, EQ. 35 yields an excess gain per unit distance $\alpha$=0.244.

Figure 8:
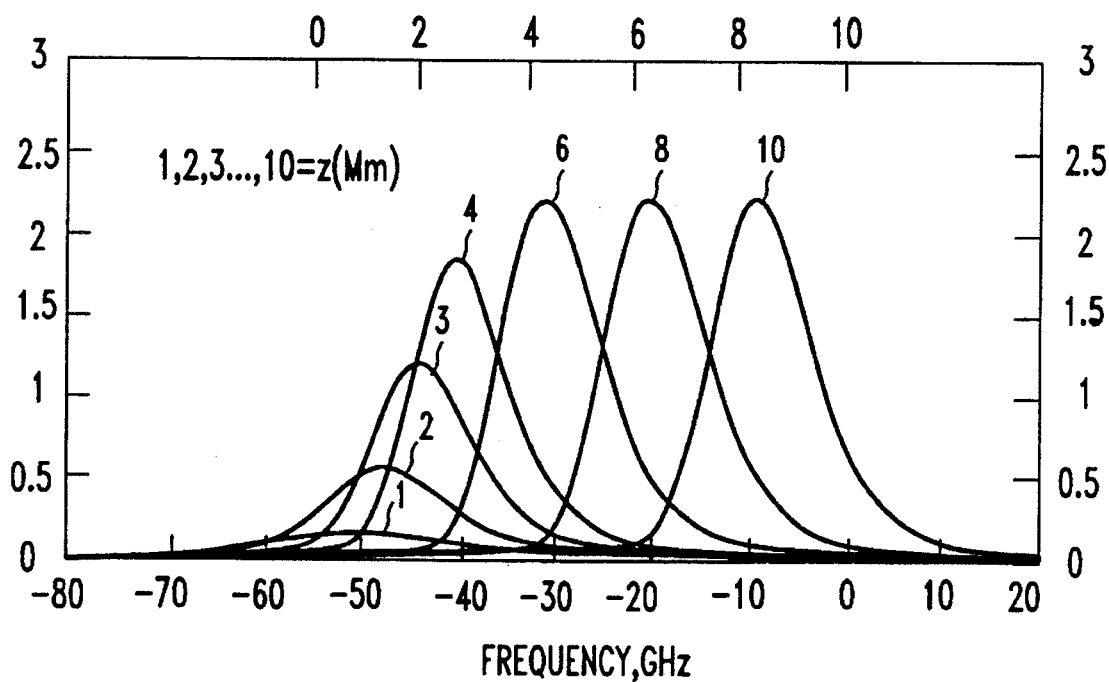
FIG. 8 shows the noise spectral density versus frequency, at various positions along a transmission medium with sliding-frequency guiding filters, normalized to that density obtaining at 10 Mm with no filtering.

To compute the noise spectrum shown in FIG. 8, it is necessary to sum the noise contributions generated in each segment of the transmission medium as modified by the appropriate excess gain factor and by the accumulated loss of the frequency-sliding, guiding filters. For example, when the filter transmission functions are represented by $\exp(-\eta(\omega-\omega_f)^2)$, the noise spectral density (noise power per unit bandwidth) at distance z, as normalized to the noise spectral density which would obtain at the total system length L with no filtering, is, $$N(\omega,z) = \frac{1}{L}\int_0^z \exp\left(\alpha x - \eta[(\omega-\omega'_f z)^2 x + \right.$$

$$\left. (\omega-\omega'_f z)\omega'_f x^2 + \omega'^2_f x^3/3]\right)dx \qquad 36$$

FIG. 8 shows N($\omega$,z) as computed numerically for the particular parameters of the example, essentially according to EQ. 36, except that actual Lorentzian filter functions were used. Each curve in FIG. 8 is labeled to denote the noise spectral density curve at a particular distance z in Mm along the transmission medium. Moreover, the curves are normalized to the density achieved at 10 Mm for a transmission system without the sliding filters, that is, with conventional identical filters. After about 5 Mm, the peak spectral density saturates at a very acceptable level which is slightly greater than 2.0. In the prior art systems without sliding-frequency guiding filters, the peak noise spectral density would have risen at an exponential rate, by nearly $e^{10}$ ~20,000 times!

Figure 9:
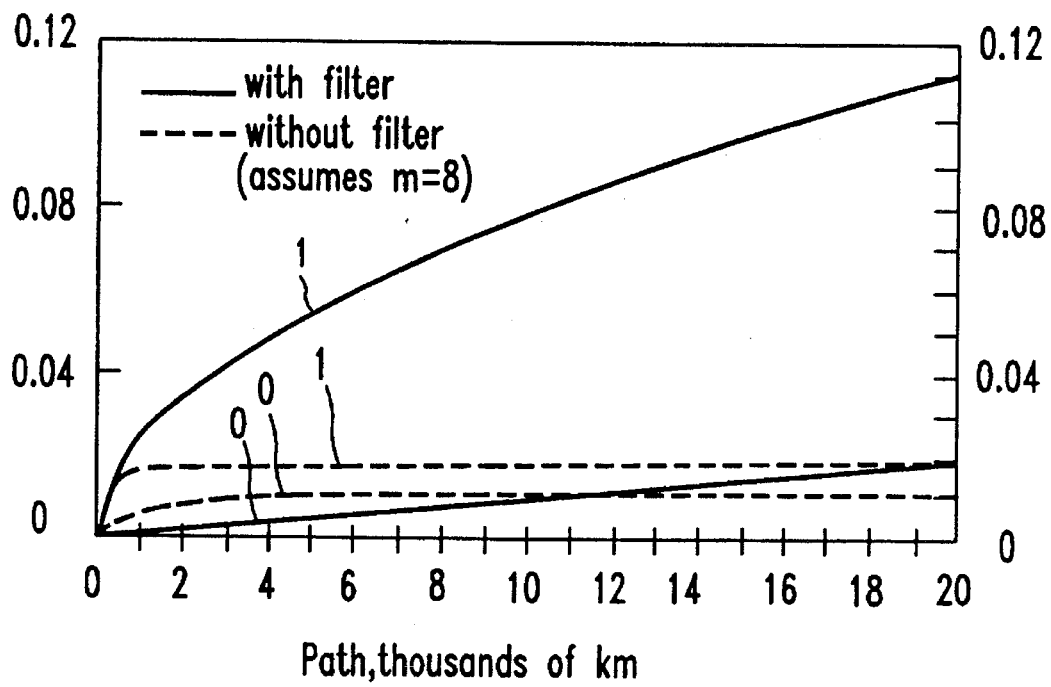
FIG. 9 shows the normalized standard deviations of the soliton energy ("ones") and of the noise in empty bit periods ("zeros") versus distance along the transmission medium.

In FIG. 9, normalized standard deviations of the soliton energy ("ones") and normalized standard deviations of the noise energy in empty bit periods ("zeros") are plotted against distance z. Curves labeled with the number "1" relate to soliton energy while curves labeled with the number "0" relate to noise energy. These curves are obtained from EQ. 28, data in FIG. 8, and analysis described by us in *J. Lightwave Technology*, 9, p. 170 (1991). The solid curves represent a system without sliding-frequency guiding filters; the dashed curves represent the same system with sliding frequency guiding filters. Fiber loss is assumed to be 0.21 dB/km and effective core area of the optical fiber is assumed to be 50 $\mu m^2$. Amplifier spacing and excess spontaneous emission factor are 28 km and 1.4, respectively. With sliding filters, both standard deviations ("0" and "1") soon become clamped to small, constant values which correspond to immeasurably small bit error rates.

Figure 10:
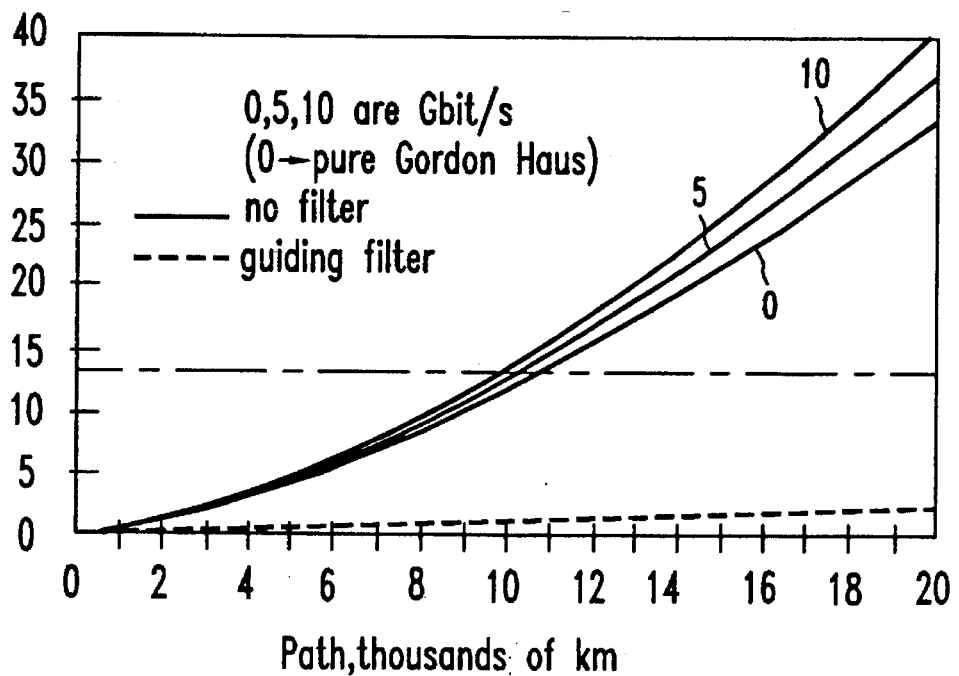
FIG. 10 shows the standard deviations in soliton arrival times versus distance, for the sliding-frequency guiding filter arrangement of FIG. 1 (dashed curves) and with no filtering at all (solid curves)

In FIG. 10, the standard deviation in timing jitter is plotted versus the path length. Approximate effects of the acoustic interaction are included as described in *Soviet Lightwave Communications*, 1, p. 235 (1991), but as modified by our own experimental measurements described in the *Electronics Letters* article cited above. The effects are plotted for several different bit rates, 0, 10, and 20 Gbps where 0 Gbps represents the pure Gordon-Haus effect described earlier. Solid curves represent system performance without the sliding filters while the dotted curve represents the system performance with sliding filters. For example, at a distance of 10 Mm, the standard deviation in timing jitter for the sliding filter system is approximately 2 psec, which is suitable for error-free transmission at 20 Gbit/s or more per channel, as compared with a standard deviation of 15 psec for the system without sliding filters. Clearly, error-free transmission of higher bit-rate soliton channels is achievable through the use of sliding-frequency guiding filters.

The sliding-frequency guiding filter approach described above can undesirably burden system designers and manufacturers by requiring a significant number of individually tuned optical filters for the entire soliton transmission system. For example, in a transoceanic system requiring 30 km spacing between adjacent filters, the entire 9,000 km system requires installation of approximately 300 individually tuned filters. In order to alleviate this problem and as an alternative improvement to the invention described above, I have discovered that the superior transmission environment afforded by the sliding-frequency guiding filters can be maintained in a system where the N×L optical filters are arranged so that N consecutive filters are designated to be in one of the L filter groups along the soliton transmission system.

Optical filters in a particular filter group have their nominal center frequencies combined to form a group-average center frequency for that group. The group-average center frequency for a group differs from the group-average center frequency for the other groups. Over the system, the group-average center frequencies for the plurality of groups are selected and distributed along the system to provide an average frequency sliding rate for translating the solitons. The average frequency sliding rate is measured in units of frequency per unit distance.

While it is preferred that the separation between adjacent filters be uniform, it is anticipated that distribution of the optical amplifier and filter elements 12 may result in a non-uniform separation between adjacent filters in a group or between adjacent groups. In the description which follows, the embodiments of this invention utilize substantially uniform separation between adjacent filters.

Figure 11:
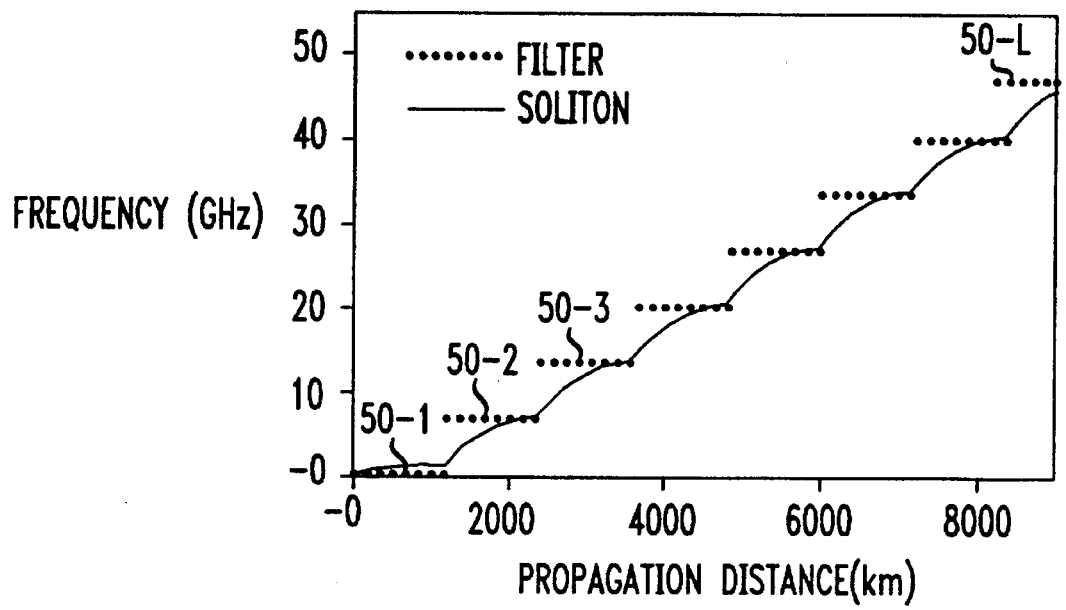
FIGS. 11 and 12 show exemplary embodiments of a soliton transmission system employing plural groups of sliding-frequency guiding optical filters.

In FIG. 11, a soliton transmission system is shown employing plural groups of sliding-frequency guiding optical filters wherein each group comprises filters tuned to a substantially identical optical nominal center frequency. That is, the optical filters depicted in group 50-1 are set to substantially the same optical frequency. Similarly, the filters in group 50-2 are set to the same optical frequency. As a result, the group-average center frequency for a particular group of filters is substantially equal to the nominal center frequency for each filter in the group. It should be noted that each of the groups exhibits a different group-average center frequency than the other groups. But when viewed across the transmission system, the group-average center frequencies of the groups establish an average frequency sliding rate for the system so that the solitons are accelerated from one frequency to the next while maintaining their soliton properties. The average sliding rate is approximated in FIG. 11 by the slope of the solid line which represents the average frequency of solitons propagating along the system.

The example shown in FIG. 11 is for a simulation in which each group comprises 40 optical filters having a 30 km separation between adjacent filters. Each filter is a Fabry-Perot etalon with a free spectral range of approximately 100 GHz and reflectivity of approximately 0.081. There is substantially no standard deviation among the nominal center frequencies for the optical filters in a particular group. By creating a frequency gap of 6.72 GHz between adjacent filter groups, it is possible to establish an average sliding rate of 5.6 GHz/Mm across the soliton transmission system. In a 9,000 km transoceanic system, the group size and filter separation result in a need for only eight different groups to span the distance. As the number of filter groups is decreased for a given length system, the frequency gap between adjacent groups is increased in order to maintain a comparable average frequency sliding rate. This, in turn, causes the solitons to suffer an increased loss. As this added loss is off-set by increasing the gain of optical amplifiers along the system, there will be a concomitant increase in the jitter experienced by solitons. While system designers may opt the smallest possible number of filter groups in a particular soliton transmission system, it should now be understood that a decrease in the number of filter groups is counteracted by an increase in the amount of jitter experienced by the solitons.

An evaluation of jitter as a function of the number of filter groups was performed by computer simulation for the system shown in FIG. 11. The results of this evaluation are depicted in the data points marked by an "x" in FIG. 13. This simulation assumed a system length of 9,000 km, a system transmission rate of 10 Gbps, and a soliton pulse width of approximately 20 ps. The results shown in FIG. 13 reveal that the assumed soliton transmission system introduces an almost negligible increase (0.2 ps) in jitter relative to the system shown in FIG. 3 when eight filter groups are employed using approximately 40 filters per group.

Figure 12:
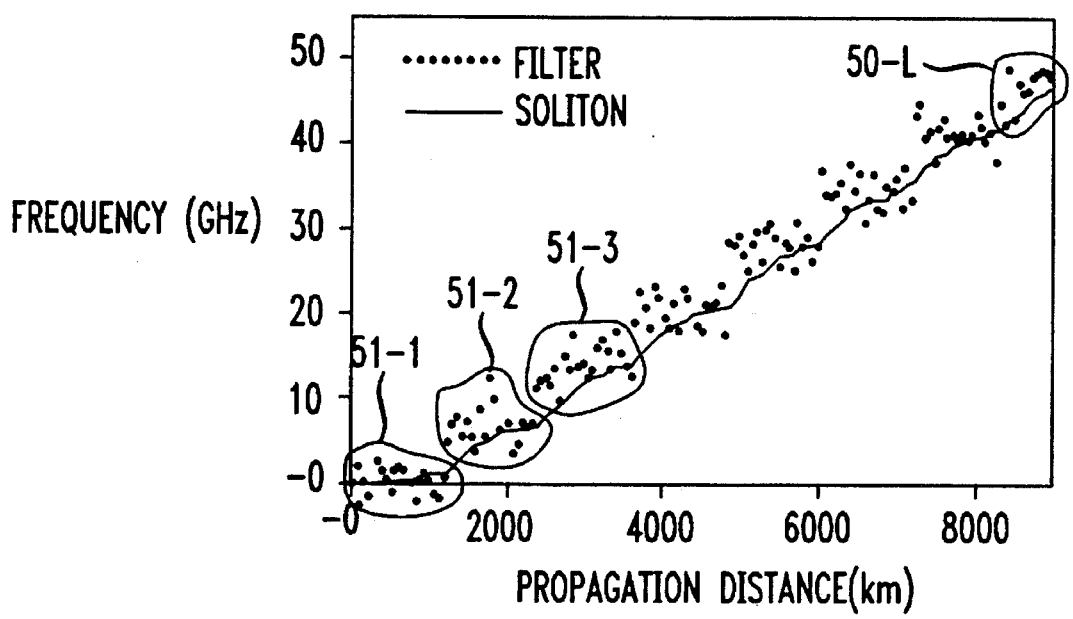
Figure 13:
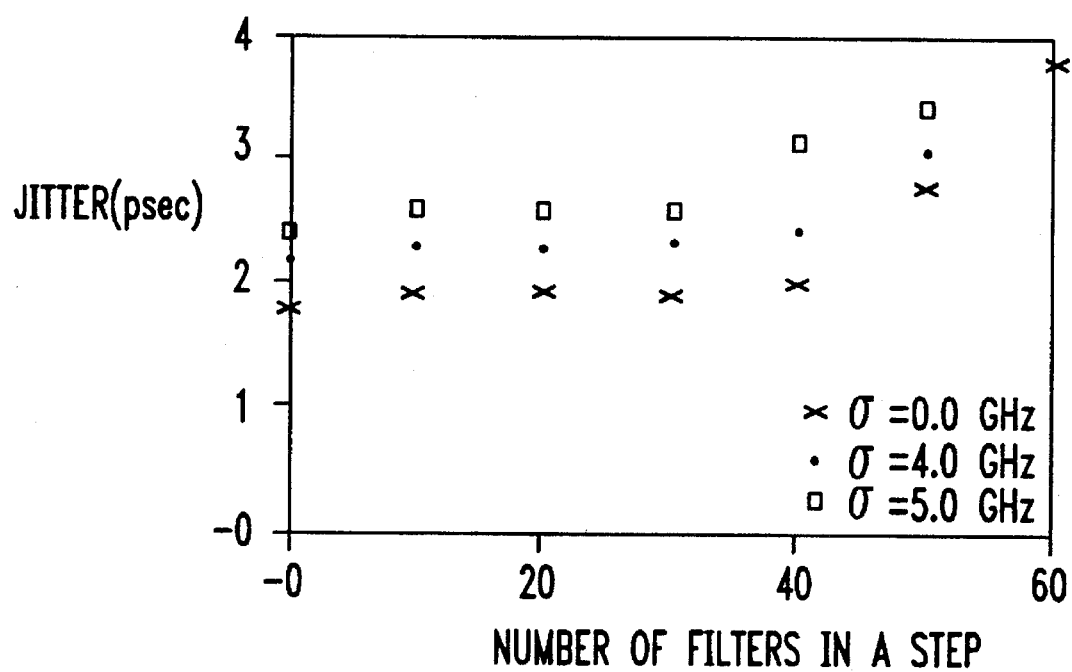
FIG. 13 shows standard deviation in soliton arrival times versus the number of filters per group for the embodiments shown in FIGS. 11 and 12.

It is understood that imperfections may occur in the tuning of individual filters to a nominal center frequency established for a group. Such contemplated imperfections are depicted in FIG. 12 wherein the L filter groups 51 each show a random distribution of their filters' nominal center frequencies. In FIG. 13 and in the simulation performed for the system depicted in FIG. 13, a Gaussian distribution was established for the nominal center frequencies of the filters in a particular group. It is contemplated that other distributions such as uniform, Rician, and the like may be suitable random distributions.

FIG. 13 shows the results of a simulation of a soliton transmission system identical in all but one respect to the system described above. The singular difference in this case is that the nominal center frequencies for the filters in a particular group are randomly distributed around an ideal center frequency. The points represented by dots relate to the case where the standard deviation of the filter nominal center frequency distribution is approximately 4.0 GHz; and the points represented by squares relate to the case where the standard deviation of the filter nominal center frequency distribution is approximately 5.0 GHz. These results reveal that as long as the standard deviation of the filter nominal center frequency distribution within a filter group is smaller than 5 GHz for the assumed system, there will be only a small increase in soliton jitter resulting from this imperfect filter tuning.

Sliding-frequency guiding filters and their filter groups bring several other important benefits to optical soliton transmission systems. First, they make the system performance much less sensitive to defects in the input pulses. In a system without sliding filters, the dispersive wave radiation shed by imperfect pulses always remains in the same frequency band with the solitons, and hence can add significantly to the noise. However, with strong, sliding-frequency guiding filters, such noise tends to be generated entirely in the first fraction of a Megameter of the transmission medium, so that the sliding filters can completely remove the noise long before it reaches the receiver. Second, a similar "cleaning" effect applies to another potentially important source of noise, viz., the dispersive wave radiation shed by the solitons as they react to polarization dispersion. Third, the use of sliding filters should enable a great reduction in the number of isolators required to suppress the build up of noise from Rayleigh double backscattering. At most, only a handful of isolators would be required to be located desirably near the output end of the system, if at all. Fourth, strong damping constants permitted by sliding filters greatly reduce the various penalties of wavelength-division-multiplexing (WDM), such as from soliton-soliton overlap at the system input. Finally, strong filters substantially help with the problem of equalizing signal strengths among channels.

Soliton sliding filters have been described above here using only simple, passive, polarization-independent devices which are fully compatible with extensive WDM. By contrast, filtering in the time domain requires active devices, with all the same drawbacks of complexity, reduced reliability, high cost, and incompatibility with WDM that accompany electronic regeneration.

It is understood that the description above relied on a parabolically-shaped filter response characteristic in order to simplify the explanation of the principles of this invention.

The parabolically-shaped response offers a useful ratio of damping (for amplitude and phase variations) to loss. In practice, it is contemplated that any realizable filter response characteristic shape may be employed. For example, a strong, square-shaped response characteristic is expected to yield superior results. Other filter strength and sliding rate characteristics have been described in my co-pending U.S. patent application Ser. No. 08/297,336 (Mamyshev-Mollenauer Case 2-31) filed on Aug. 29, 1994, which is expressly incorporated herein by reference.

What is claimed is:

1. A lightwave transmission system supporting soliton propagation in a particular band of frequencies and comprising an optical fiber transmission medium including both a plurality of optical amplifiers spaced apart along the optical fiber transmission medium and a plurality of optical filters spaced apart along the optical fiber transmission medium, the lightwave transmission system CHARACTERIZED IN THAT, the plurality of optical filters is organized into a plurality of filter groups, each filter group comprising at least N filters where N is an integer and $N \geq 2$, each filter group exhibits a group average center frequency which is different from the group average center frequency of each other filter group, the plurality of filter groups together exhibit an average frequency sliding rate for moving the frequency of the soliton toward each filter group's group average center frequency, each group average center frequency being in the particular band of frequencies.

2. The lightwave transmission system as defined in claim 1 wherein each optical filter in a filter group exhibits a nominal center frequency substantially equal to the nominal center frequency of each other optical filter in that filter group.

3. The lightwave transmission system as defined in claim 1 wherein each optical filter in a filter group exhibits a nominal center frequency and wherein the nominal center frequencies for optical filters in the same filter group exhibit a random distribution about said group average center frequency associated with the filter group.

4. The lightwave transmission system as defined in claim 1 wherein the group average center frequencies of the plurality of optical filter groups increase substantially monotonically as a function of distance over the length of the transmission medium.

5. The lightwave transmission system as defined in claim 1 wherein the group average center frequencies of the plurality of optical filter groups decrease substantially monotonically as a function of distance over the length of the transmission medium.

6. The lightwave transmission system as defined in claim 1 wherein, over at least a portion of the transmission system, the group average center frequencies of the plurality of optical filter groups change from a first frequency to a second frequency at an average frequency sliding rate less than or equal to approximately $(2/27)^{1/2}\eta$, where $\eta$ describes curvature per unit soliton length of a parabolically-shaped filter response around the nominal center frequency.

7. The lightwave transmission system as defined in claim 1 wherein the plurality of filter groups adiabatically translate the solitons along the transmission medium from a first frequency to a second frequency different from the first frequency so that the solitons are separated in frequency from noise generated by the amplifying means and wherein a magnitude of the difference between the first and second frequencies is greater than or equal to one-half the bandwidth of the soliton.

* * * * *